United States Patent
New

(10) Patent No.: US 8,448,884 B2
(45) Date of Patent: May 28, 2013

(54) EGGSHELL MEMBRANE SEPARATION PROCESS

(75) Inventor: Levi New, Kalamazoo, MI (US)

(73) Assignee: Taprogge Gesellschaft mit beschraenkter Haftung, Wetter an der Ruhr (DE)

( * ) Notice: Subject to any disclaimer, the term of this patent is extended or adjusted under 35 U.S.C. 154(b) by 218 days.

(21) Appl. No.: 13/104,760

(22) Filed: May 10, 2011

(65) Prior Publication Data

US 2011/0272502 A1 Nov. 10, 2011

Related U.S. Application Data

(60) Provisional application No. 61/333,161, filed on May 10, 2010.

(51) Int. Cl.
*B02C 19/18* (2006.01)

(52) U.S. Cl.
USPC .................................. 241/1; 241/18; 241/301

(58) Field of Classification Search
USPC ................................ 241/1, 301, 18
See application file for complete search history.

(56) References Cited

U.S. PATENT DOCUMENTS

| | | |
|---|---|---|
| 3,255,793 A | 6/1966 | Clute |
| 4,102,654 A | 7/1978 | Pellin |
| 4,272,499 A | 6/1981 | Cason et al. |
| 4,390,131 A | 6/1983 | Pickrel |
| 4,418,871 A | 12/1983 | Powell |
| 4,439,042 A | 3/1984 | Bertoglio |
| 4,848,673 A | 7/1989 | Masuda et al. |
| 5,242,270 A | 9/1993 | Partington et al. |
| 6,024,307 A | 2/2000 | Sand et al. |
| 6,289,143 B1 | 9/2001 | Berthold et al. |
| 6,491,242 B1 | 12/2002 | Dingee, IV et al. |
| 6,588,686 B2 | 7/2003 | Dingee, IV et al. |
| 6,649,203 B1 | 11/2003 | Thoroski |
| 6,722,594 B2 | 4/2004 | Graham |
| 6,899,294 B2 | 5/2005 | MacNeil |
| 6,978,953 B2 | 12/2005 | Graham |
| 7,040,557 B2 | 5/2006 | Graham et al. |
| 7,059,550 B2 | 6/2006 | Graham et al. |
| 7,137,580 B2 | 11/2006 | Graham et al. |

(Continued)

FOREIGN PATENT DOCUMENTS

| | | |
|---|---|---|
| DE | 197 47 628 A1 | 5/1999 |
| EP | 0 079 300 A1 | 5/1983 |

(Continued)

OTHER PUBLICATIONS

International Preliminary Report on Patentability, PCT/US2011/035820, filed May 10, 2011, and mailed Nov. 13, 2012, 5 pgs.

(Continued)

*Primary Examiner* — Mark Rosenbaum
(74) *Attorney, Agent, or Firm* — John R. Thompson; Stoel Rives LLP

(57) ABSTRACT

A system and process for separating eggshell membranes from eggshells. The system and process may utilize airflow through a venturi to pulverize the eggshell and thereby separate the eggshell from the membrane. Furthermore, in some embodiments, the process may also extract moisture from the membrane and eggshell. The system may further be configured to collect the pulverized eggshell particles separately from the membrane material.

13 Claims, 4 Drawing Sheets

U.S. PATENT DOCUMENTS

| | | | |
|---|---|---|---|
| 7,374,113 B2 | 5/2008 | Graham et al. | |
| 7,429,008 B2 | 9/2008 | Graham et al. | |
| 7,500,830 B2 | 3/2009 | Graham et al. | |
| 7,954,733 B2 * | 6/2011 | Vlad | 241/1 |
| 2001/0042802 A1 | 11/2001 | Youds | |
| 2003/0021720 A1 | 1/2003 | Reisfeld et al. | |
| 2003/0206796 A1 | 11/2003 | Scholten | |
| 2006/0051236 A1 | 3/2006 | Case et al. | |
| 2007/0014684 A1 | 1/2007 | Case et al. | |

FOREIGN PATENT DOCUMENTS

| | | |
|---|---|---|
| EP | 0 079 300 B1 | 5/1983 |
| FR | 2 311 588 | 12/1976 |
| FR | 2 661 450 | 10/1991 |
| GB | 313 582 A | 12/1929 |
| GB | 591 921 A | 9/1947 |
| GB | 911 454 | 11/1962 |
| GB | 2 358 629 A | 1/2001 |
| GB | 2 354 232 A | 3/2001 |
| GB | 2 357 499 A | 6/2001 |
| GB | 2 357 712 A | 7/2001 |
| GB | 2 357 712 B | 10/2002 |
| JP | 01125554 | 5/1989 |
| JP | 08-173838 A | 7/1996 |
| JP | 11 160290 A | 6/1999 |
| WO | WO 92/12795 | 8/1992 |
| WO | WO 93/12884 | 7/1993 |
| WO | WO 98/35756 | 8/1998 |
| WO | 98/41326 | 9/1998 |
| WO | WO 99/53130 | 10/1999 |
| WO | WO 00/13799 | 3/2000 |
| WO | WO 01/03840 A1 | 1/2001 |
| WO | WO 01/12332 A2 | 2/2001 |
| WO | WO 02/8630 A2 | 1/2002 |
| WO | WO 03/006166 A1 | 1/2003 |
| WO | 2008/139477 A2 | 11/2008 |

OTHER PUBLICATIONS

International Search Report, Form PCT/ISA/210, PCT/ZA2004/000126, Aug. 24, 2005, 8 pgs.

PCT Invitation to Pay Additional Fees and Annex to Form PCT/ISA 206, Communication Relating to the Results of the Partial International Search for PCT/ZA2005/000006, Jun. 24, 2005, 5 pgs.

Annex to Form PCT/ISA/206, Communication Relating to the Results of the Partial International Search for PCT/ZA2004/000126, 2 pgs.

U.K. Patent Office Search Report for GB0406494.5, dated Nov. 10, 2004, 1 pg.

Office Action for U.S. Appl. No. 11/168,270, filed Jun. 28, 2005, mailed from the USPTO on Apr. 11, 2008, 14 pgs.

Office Action for U.S. Appl. No. 11/243,541, filed Oct. 5, 2005, mailed from the USPTO on Apr. 10, 2008, 15 pgs.

Office Action for U.S. Appl. No. 11/478,900, filed Jun. 30, 2006, mailed from the USPTO on Dec. 27, 2007, 11 pgs.

Office Action for U.S. Appl. No. 11/298,142, filed Dec. 9, 2005, mailed from USPTO on Sep. 13, 2007, 6 pgs.

Written Opinion for PCT/US07/10810, filed May 4, 2007, and mailed Aug. 19, 2008, 3 pgs.

International Search Report and Written Opinion, PCT/US2011/035820, filed May 10, 2011, and mailed Jan. 2, 2012, 8 pgs.

* cited by examiner

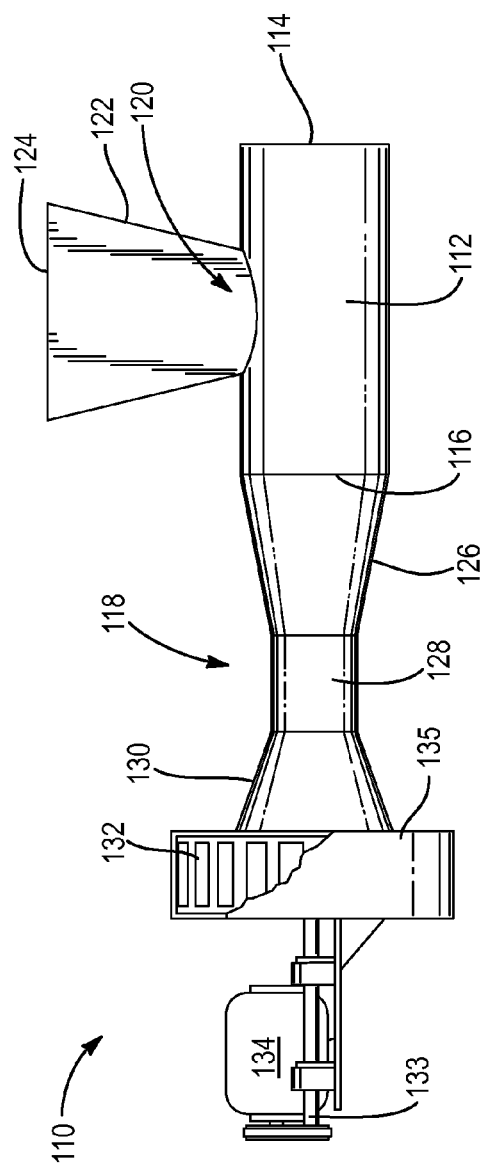
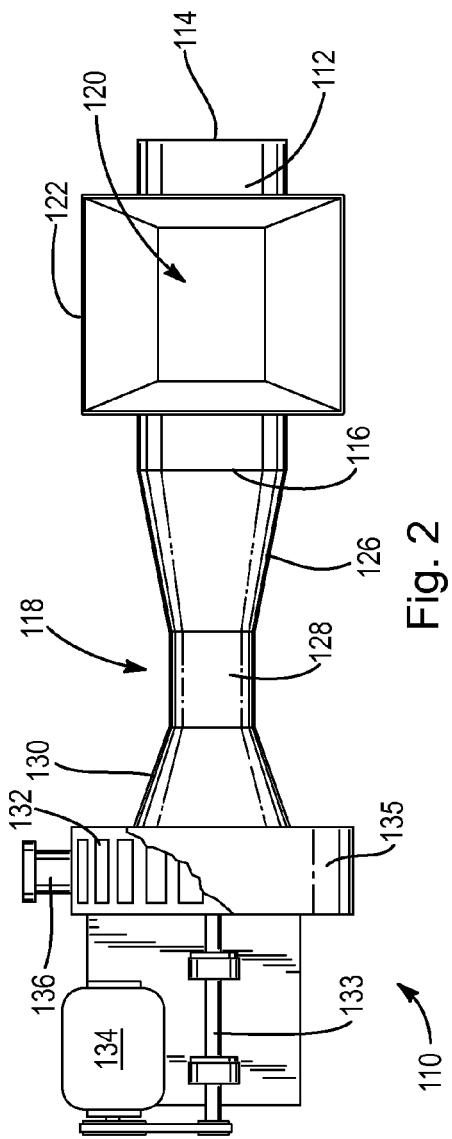

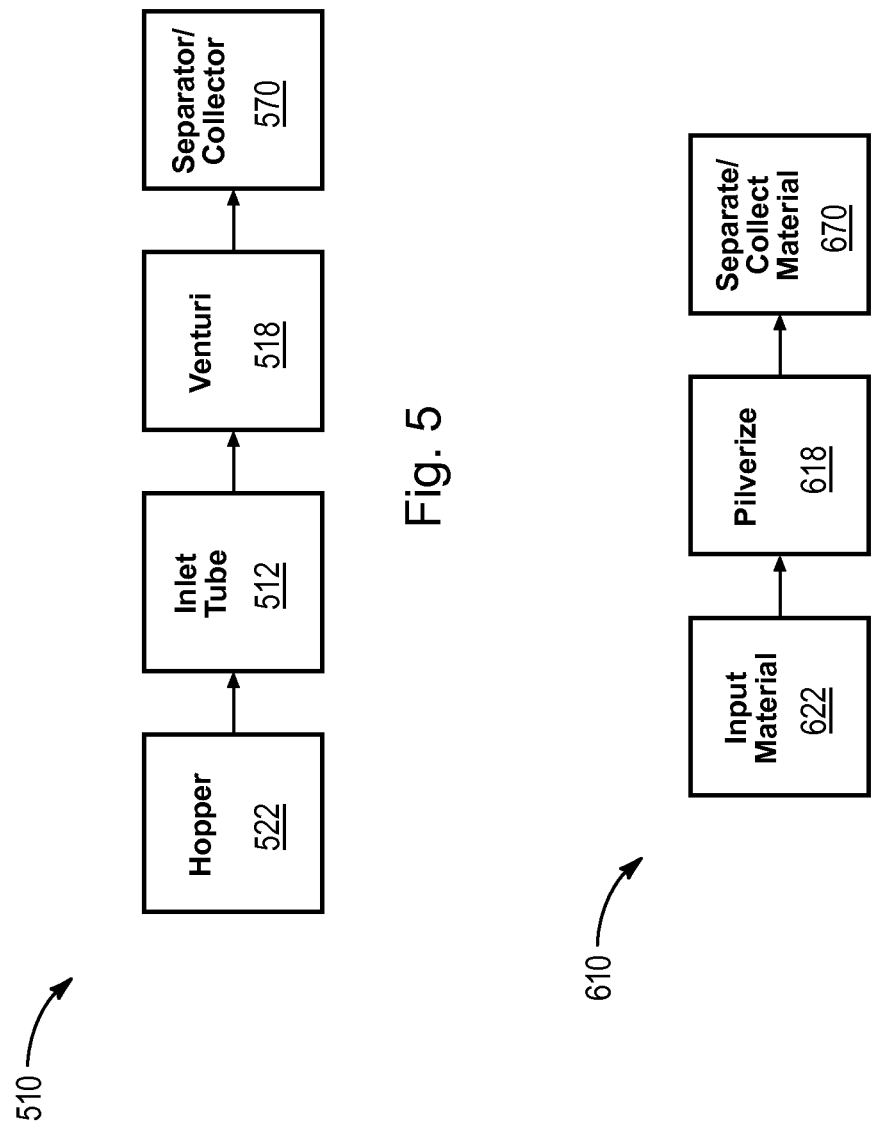

EGGSHELL MEMBRANE SEPARATION PROCESS

RELATED APPLICATION

This utility application claims priority to, and hereby incorporates by reference, U.S. Provisional Application 61/333,161, filed on May 10, 2010, entitled "Eggshell Membrane Separation Process."

TECHNICAL FIELD

The present disclosure relates generally to systems, methods, techniques, and processes for eggshell membrane separation. More specifically, this disclosure relates to eggshell membrane separation through use of a device or system which may include a venturi.

BRIEF DESCRIPTION OF THE DRAWINGS

The embodiments disclosed herein will become more fully apparent from the following description and appended claims, taken in conjunction with the accompanying drawings. These drawings depict only typical embodiments, which will be described with additional specificity and detail through use of the drawings in which:

FIG. 1 is a side view of one embodiment of an eggshell membrane separation system.

FIG. 2 is a top view of the eggshell membrane separation system of FIG. 1.

FIG. 5 is a flow chart which schematically represents a system and method of eggshell membrane separation.

FIG. 6 is a flow chart illustrating a method of eggshell membrane separation.

DETAILED DESCRIPTION

Figure 3:
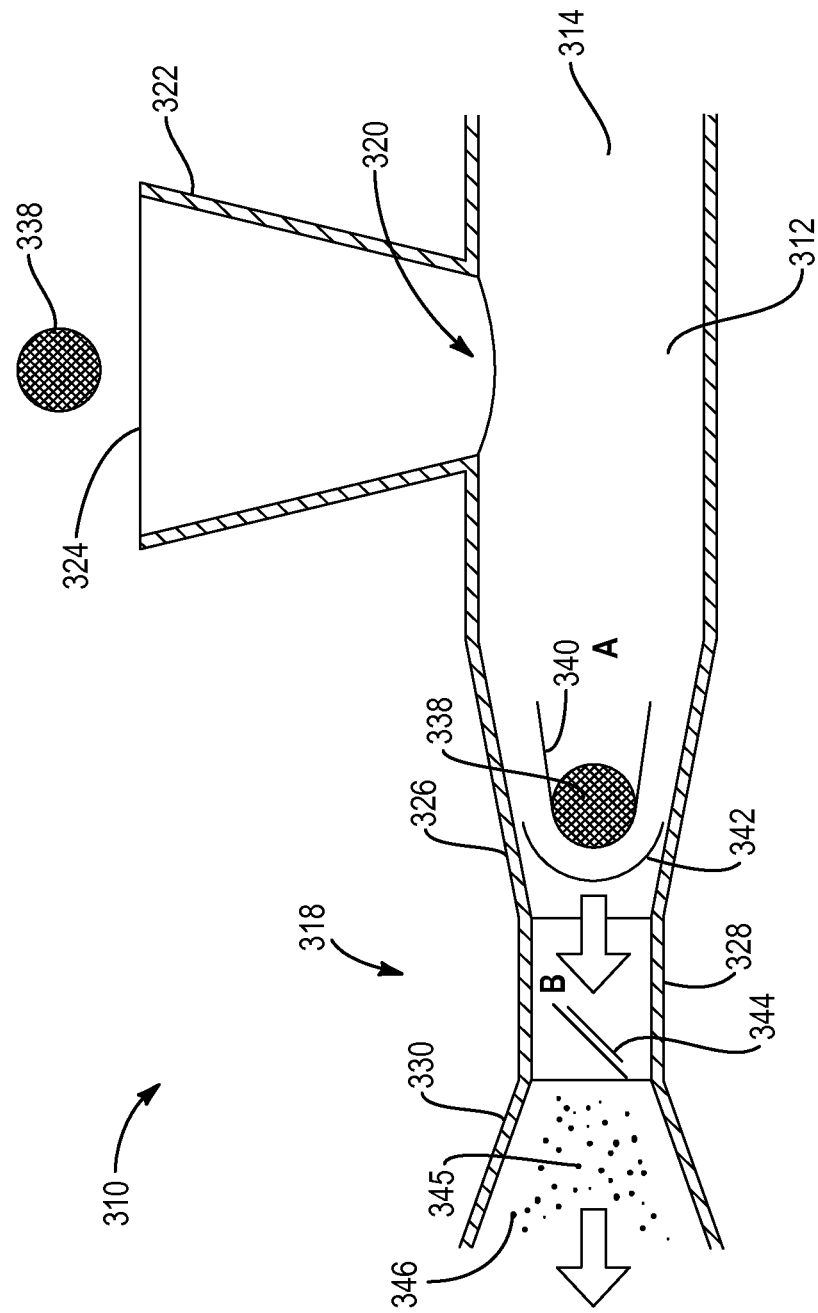
FIG. 3 is a cross sectional view of another embodiment of an eggshell membrane separation system.

An eggshell membrane separation system may utilize a venturi to process material suspended in an airflow. The interaction of the material with shock waves and/or pressure changes within the venturi may pulverize portions of the material. A system or method that utilizes a venturi to pulverize unprocessed eggshells may be configured to pulverize the brittle portion of an eggshell, thereby separating it from the more elastic membrane of the eggshell.

It will be readily understood that the components of the embodiments, as generally described and illustrated in the figures herein, could be arranged and designed in a wide variety of different configurations. Thus, the following more detailed description of various embodiments, as represented in the figures, is not intended to limit the scope of the disclosure, but is merely representative of various embodiments. While the various aspects of the embodiments are presented in drawings, the drawings are not necessarily drawn to scale unless specifically indicated.

The phrases "connected to," "coupled to," and "in communication with" refer to any form of interaction between two or more entities, including mechanical, electrical, magnetic, electromagnetic, fluid, and thermal interaction. Two components may be coupled to each other, even though they are not in direct contact with each other. For example, two components may be coupled to each other through an intermediate component.

As used herein, "unprocessed eggshells" refers to eggshells which include both the brittle outer portion and a membrane attached, or partially attached, to the inner surface of the brittle portion of the eggshell. An "unprocessed" eggshell may not necessarily contain the yolk or white found inside unbroken eggs. "Pulverized eggshell particles" refer to fragments and/or powder comprised primarily of the brittle outer portion of an unprocessed eggshell after it has been processed as described below. The eggshell "membrane" refers to a thin membrane layer which may be found on the inside surface of an unprocessed eggshell.

The longitudinal direction of a tube or pipe refers to a direction along the center axis of the tube or pipe.

As used herein, a venturi refers to a length of tubes or pipes which transitions from a first diameter to a second diameter, smaller than the first, then to a third diameter, which is larger than the second. The transitions may take place evenly over a longitudinal length of the venturi. Further, longitudinal sections of a venturi, for example the center section, may have substantially constant diameters.

FIG. 1 is a side view of one embodiment of an eggshell membrane separation system and FIG. 2 is a top view of the eggshell membrane separation system of FIG. 1. As illustrated in FIGS. 1 and 2, a system 110 for separating eggshell membranes and extracting moisture may include an inlet tube 112. The inlet tube 112 may define a first end 114, communicating with free space, and an opposing, second end 116 which may be coupled to a venturi 118. Although reference is made herein to tubes and pipes, all such elements may have circular, rectangular, hexagonal, and/or other cross-sectional shapes.

The inlet tube 112 may have a length, between its first end 114 and its second end 116, in which material may accelerate before entering the venturi 118. In some embodiments, the system may be configured such that air flow enters the inlet tube 112 at the first end 114. In some embodiments, a filter (not shown) may be placed such that it prevents introduction of foreign particles into the first end 114 of the inlet tube 112. It is noted that, though in the illustrated embodiment the inlet tube 112 has a substantially constant diameter along its length, this may not be the case in all embodiments.

The inlet tube 112 may further include an elongated opening 120. In the illustrated embodiment, the elongated opening 120 is located on an upper portion of the inlet tube 112. The elongated opening 120 may be in communication with an open lower end of a hopper 122. The hopper 122 may also have an open upper end 124, configured to receive materials, such as unprocessed eggshells. In certain embodiments, the system 110 may not include a hopper 122. In such embodiments, material, such as unprocessed eggshells, may simply be inserted into the elongated opening 120 by any method known in the art.

The venturi 118 may include a converging portion 126 coupled to the inlet tube 112. The converging portion 126 may progressively reduce in diameter from that of the inlet tube 112 to a diameter smaller than that of the inlet tube 112. The venturi 118 may also include a throat 128 which may maintain a substantially constant diameter along its length. The throat 128 diameter may be smaller than the diameter of the inlet tube 112. Further, the venturi 118 may also include a diverging portion 130 which may progressively increase in diameter along a length of the venturi in the direction of the airflow. The diverging portion 130 may be coupled to the throat 128 by casting, screw threads, or by other known methods. As illustrated, the converging portion 126 may be longer in the longitudinal direction than the diverging portion 130.

The venturi 118 may be in communication with an airflow generator 132 which creates airflow along a path from the first end 114, through the inlet tube 112, through the venturi 118, and to the airflow generator 132. The velocity of the generated airflow may range from about 100 mph to supersonic. Due to the geometry of the system, the airflow velocity may be greater in the venturi 118 than in the inlet tube 112. The airflow generator 132 may be embodied as a fan, an impeller, a turbine, a hybrid of a turbine and fan, a pneumatic suction system, or another suitable device for generating airflow, including devices configured to generate high speed airflow.

The airflow generator 132 may be driven by a drive motor 134, which is generally represented in FIGS. 1 and 2. It is within the scope of this disclosure to use any number of motor designs or configurations. The drive motor 134 may couple to an axle 133 using any known method. The axle 133 may also engage the airflow generator 132 to power rotation. In some embodiments, the axle 133 may comprise a transmission system, including gears. The horse power of a suitable drive motor 134 may vary significantly, such as from 15 hp to 1000 hp, and may depend on the nature of the material to be treated, the desired material flow rate, the dimensions of the system, and the size of the airflow generator 132. The ranges disclosed above, as well as ranges for other variables disclosed at other points herein, are for illustrative purposes; it is within the scope of this disclosure to modify the system, for example to scale the system 110 up or down.

The airflow generator 132 may include a plurality of radially extending blades which rotate to generate high speed airflow. Further, the airflow generator 132 may be disposed within a housing 135, which may include a housing outlet 136 providing an exit for air flowing through the system 110. The housing 135 may couple with the venturi 118 and may have a housing input aperture (not shown) which allows communication between the venturi 118 and the interior of the housing 135. The blades may define radially extending flow passages through which air may pass to the housing outlet 136. In some embodiments, the processed material may exit the housing 135 with the airflow leaving the housing 135.

FIG. 3 is a cross sectional view of another embodiment of an eggshell membrane separation system 310, which can, in certain respects, resemble components of the eggshell membrane separation system 110 described in connection with FIGS. 1 and 2 above. It will be appreciated by one of ordinary skill in the art having the benefit of this disclosure, that all the illustrated embodiments have analogous features. Accordingly, like features are designated with like reference numerals, with the leading digits incremented to "3." (For instance, the venturi is designated "128" in FIGS. 1 and 2 and an analogous venturi is designated as "328" in FIG. 3.) Relevant disclosure set forth above regarding similarly identified features thus may not be repeated hereafter. Moreover, specific features of the eggshell membrane separation systems and methods, as well as related components and/or steps shown in FIGS. 1 and 2, may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the eggshell membrane separation system 310 of FIG. 3. Any suitable combination of the features, and variations of the same, described with respect to the eggshell membrane separation system and components illustrated in FIGS. 1 and 2, can be employed with the eggshell membrane separation system and components of FIG. 3, and vice versa. This pattern of disclosure applies equally to further embodiments depicted in subsequent figures and described hereafter.

FIG. 3 illustrates one embodiment of the operation of a venturi 318 during the processing of material, such as unprocessed eggshells 338. In the illustrated embodiment, the unprocessed eggshells 338 are introduced into the inlet tube 312 through the upper end 324 of a hopper 322 and elongated opening 320. Prior to introduction of the unprocessed eggshells 338, the airflow generator (not shown) may be utilized to create an airflow within the system 310 traveling from the first end 314 of the inlet tube 312 through the venturi 318. (The airflow may be in the direction indicated by the arrow in FIG. 3.) The airflow velocity may substantially accelerate within the venturi 318. The unprocessed eggshells 338 may be propelled by the airflow from the inlet tube 312 into the venturi 318. The system may be designed such that the unprocessed eggshells 338 are smaller in diameter than the interior diameter of the inlet tube 312; thus a gap may be present between the inner diameter of the inlet tube 312 and the unprocessed eggshells 338 when the unprocessed eggshells 338 are disposed within the inlet tube 312.

As the unprocessed eggshells 338 enter the converging portion 326, the gap may become narrower such that the eggshells 338 eventually cause a substantial reduction in the cross sectional area of the converging portion 326 through which air can flow. A recompression shock wave 340 may trail rearwardly from the eggshells 338 and a bow shock wave 342 may build up ahead of the eggshells 338. Where the converging portion 326 merges with the throat 328, there may also be a standing shock wave 344. The action of these shock waves 340, 342, and 344 pulverize the brittle outer portion of the unprocessed eggshells 338. The pulverized eggshells 345 and membranes 346 may continue through the venturi 318 into the airflow generator (not shown).

In some embodiments, the pulverization of unprocessed eggshells 338 may be affected by the speed or volume of airflow through the venturi 318. Thus, in some instances, parameters such as inlet tube 312 diameter, throat 328 diameter, airflow velocity, and similar parameters may be configured to pulverize the unprocessed eggshells 338 in a desired manner or to control the properties (such as particle size and/or moisture content) of the pulverized eggshells 345 and processed membranes 346.

In some embodiments, the system 310 may be configured to separate unprocessed eggshells 338 from attached membranes without destroying the membranes. In one exemplary embodiment, unprocessed eggshells 338 may be introduced into the airflow through the hopper 322. (The unprocessed eggshells 338 may be obtained from other applications in which the unprocessed eggshells 338 are considered waste, such as egg cracking operations for use in baking.) In the exemplary embodiment, the unprocessed eggshells 338 may flow through the inlet tube 312 along with the airflow. The speed of the airflow may be subsonic through the inlet tube 312. In one embodiment, the airflow within the inlet tube 312 (at and around point A) may be about 100 mph. In other embodiments, the speed may be greater or lower, for example from about 100 mph to about 350 mph, or from about 75 mph to 150 mph.

In the exemplary embodiment, the unprocessed eggshells 338 may then proceed along with the airflow to the converging portion 326, through the throat 328, and then to the diverging portion 330 of the venturi 318. As the unprocessed eggshells 338 reach the throat 328, the unprocessed eggshells 338 may be subjected to supersonic (Mach 1 or higher) airflow speeds. In some embodiments, the airflow at and around point B may be about Mach 1; in other embodiments it may be higher or lower than this, for example from about Mach 0.75 to about Mach 1.5. In the exemplary embodiment, as the unprocessed eggshells 338 thus proceed through the venturi 318, they may be subject to compression due to increased pressure.

In the exemplary embodiment, the unprocessed eggshells 338 may reach the standing shock wave 344 in the diverging portion 330 of the venturi 318. (In some embodiments, the unprocessed eggshells may begin to break up before reaching the standing shock wave 344.) The interaction of the unprocessed eggshells 338, or portions of unprocessed eggshells, and the standing shock wave 344 may disintegrate, pulverize, and extract moisture from the unprocessed eggshells 338 suspended in the airflow. As the outer portion of the unprocessed eggshells may be harder and/or more brittle than the membrane portion of the unprocessed eggshells 338, the outer brittle portion may disintegrate as it passes through the standing shockwave 344 while the membrane, which may be more flexible and elastic, may pass through the standing shockwave 344 intact or substantially intact. Thus, after passing through the venturi 318, the brittle portions of unprocessed eggshells may be reduced to particles or powder 345 suspended within the airflow while the membranes 346, also suspended in the airflow, may be basically intact. The pulverized eggshells 345 and the membranes 346 may then travel along the airflow for further processing.

Figure 4:
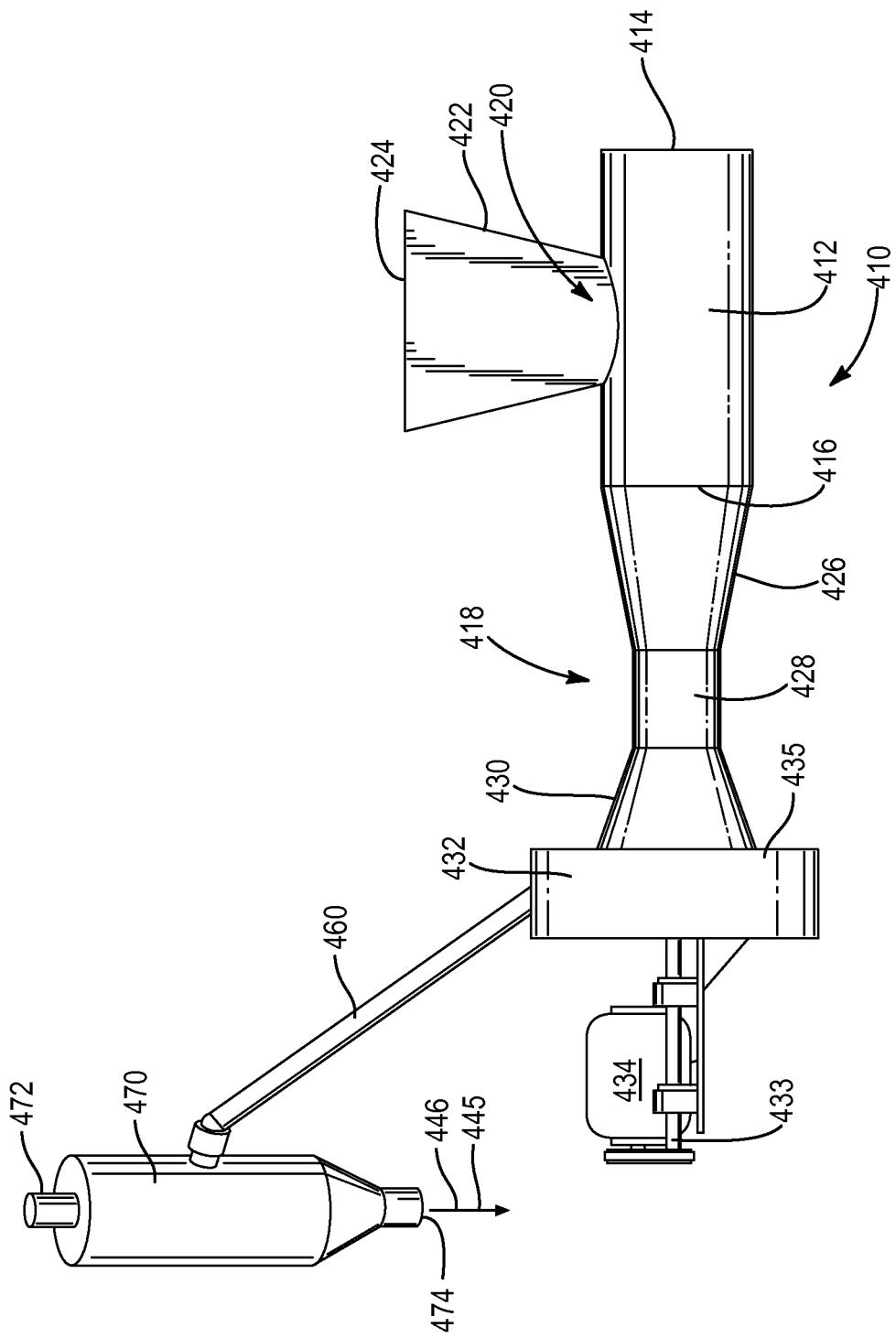
FIG. 4 is a side view of yet another embodiment of an eggshell membrane separation system.

FIG. 4 is a side view of yet another embodiment of an eggshell membrane separation system 410. The system 410 of FIG. 4 contains an apparatus analogous to FIGS. 1 and 2. System 410 additionally includes a post processing apparatus 470 to further process the pulverized eggshells and membranes. The post processing apparatus 470 may be coupled to the outlet (not shown) of the housing 432 by an outlet tube 460.

In some embodiments, the post processing apparatus 470 may be configured to separate pulverized eggshells from membranes suspended in the airflow. There are numerous possible apparatuses which may be utilized to separate these components. For example, post processing apparatus 470 may comprise a cyclone separator. In such embodiments, the cyclone separator may exhaust airflow through an outlet on the top of the cyclone separator, such as outlet 472. In those embodiments, the cyclone separator may allow the pulverized eggshells 445 and membranes 446 (which may be denser or heavier than the air) to fall to the bottom of the cyclone separator while the airflow is exhausted through the top of the device. The cyclone separator may have an outlet at the bottom of the device which includes an airlock, such as outlet 474 in FIG. 4. The pulverized eggshells 445 and membranes 446 may both exit the cyclone separator through this bottom outlet 474.

In some embodiments, the pulverized eggshells 445 and the membranes 446 may then travel over a shaker screen (not shown) with a mesh size configured to allow the pulverized eggshell particles 445 to pass through the screen while retaining the membranes 446. The membranes 446 may then be collected separately from the pulverized eggshells 445. In some embodiments, such a system may allow for collection of 80-85% of the membrane material initially introduced to the system. Further, in some embodiments, the process may also sterilize or partially sterilize the membranes collected through the process.

FIG. 5 is a flow chart which schematically represents a system and method of eggshell membrane separation 510. As shown in FIG. 5, and analogous to the disclosure related in connection with the other figures, unprocessed eggshells may first be loaded into a hopper 522 which feeds the unprocessed eggshells into an inlet tube 512. The inlet tube may be coupled to a venturi 518 through which the eggshells pass, and in which the eggshells are pulverized and the membranes separated from the brittle portion of the eggshell. The pulverized eggshells and membranes may then be processed in an apparatus 570 configured to separate the pulverized eggshells suspended in the airflow from the membranes, also suspended in the airflow, and to collect the membranes separately form the pulverized eggshells.

It is within the scope of this disclosure to add steps and components at any point in the systems and/or processes described in connection with FIG. 5 or any of the other Figures. For example, in some embodiments, the pulverized eggshells and membranes may be further processed after they are collected. In certain embodiments, the pulverized eggshells and/or membranes may be reintroduced to the system of FIG. 5 and processed again, separately or collectively, in order to, for example, further size, dry, and/or pulverize the material. In some instances, the pulverized eggshells created during the process may be in the form of chips or coarse powder; in certain embodiments, reprocessing these chips may yield a finer powder.

FIG. 6 is a flow chart illustrating a method of eggshell separation 610. Again, as is analogously described in connection with the other figures, unprocessed eggshells may first be input 622 into the system and subsequently pulverized 618. The membranes may then be separated from, and collected 670 separately from, the pulverized eggshell particles. Again, steps such as preprocessing, post processing, and/or other steps performed during the method may be added to method 610.

Without further elaboration, it is believed that one skilled in the art can use the preceding description to utilize the present disclosure to its fullest extent. The examples and embodiments disclosed herein are to be construed as merely illustrative and exemplary, and not a limitation of the scope of the present disclosure in any way. It will be apparent to those having skill in the art that changes may be made to the details of the above-described embodiments without departing from the underlying principles of the disclosure herein. It is intended that the scope of the invention be defined by the claims appended hereto and their equivalents.

The invention claimed is:

1. A method of separating eggshells and attached membranes, comprising:
   introducing unprocessed eggshells, comprising eggshells and attached membranes, into an airflow,
   wherein the airflow is generated by an airflow generator in communication with a venturi, and
   wherein the airflow subjects the unprocessed eggshells to one or more shockwaves, thereby pulverizing the eggshells.

2. The method of claim 1, wherein an inlet tube is in fluid communication with the venturi.

3. The method of claim 2, wherein an inlet device is coupled to the inlet tube such that a longitudinal axis of the inlet device is substantially perpendicular to a longitudinal axis of the inlet tube, and the unprocessed eggshells are introduced through the inlet device.

4. The method of claim 1, wherein the airflow generator is coupled to the diverging portion of the venturi.

5. The method of claim 1, further comprising, introducing the pulverized eggshells into a separation apparatus configured to collect the membranes separately from the eggshells.

6. The method of claim 5, wherein about 80% of the membranes initially introduced into the airflow are collected by the separation apparatus.

7. The method of claim 5, further comprising reintroducing the pulverized eggshells into the airflow.

8. The method of claim 1, wherein the airflow has a first velocity of about 100 mph and a second velocity of about Mach 1.

9. The method of claim 1, wherein at least one shockwave is a standing shockwave.

10. A method of processing eggshells and attached membranes, comprising:
   introducing unprocessed eggshells, comprising eggshells and attached membranes, into an airflow,
   wherein the airflow has a first velocity of about 100 mph and a second velocity of about Mach 1.

11. The method of claim 10, wherein the airflow reaches the second velocity as the airflow travels through a venturi.

12. A method of processing eggshells and attached membranes, comprising:
   introducing unprocessed eggshells, comprising eggshells and attached membranes, into an airflow,
   wherein the airflow carries the unprocessed eggshells through a standing shockwave.

13. The method of claim 12, wherein the standing shockwave is located within a venturi.

\* \* \* \* \*